United States Patent
Halker (10) Patent No.: US 7,992,302 B2
(45) Date of Patent: Aug. 9, 2011

(54) METHOD OF MANUFACTURING A PLURALITY OF CONVERTIBLE ROOFS FOR VEHICLE BODIES

(75) Inventor: Jorg Halker, Bramsche (DE)

(73) Assignee: Wilhelm Karmann GmbH, Munich (DE)

( * ) Notice: Subject to any disclaimer, the term of this patent is extended or adjusted under 35 U.S.C. 154(b) by 701 days.

(21) Appl. No.: 12/023,405

(22) Filed: Jan. 31, 2008

(65) Prior Publication Data

US 2008/0184561 A1 Aug. 7, 2008

(30) Foreign Application Priority Data

Feb. 2, 2007 (DE) .......................... 10 2007 006 073
Feb. 2, 2007 (DE) .......................... 10 2007 006 074

(51) Int. Cl.
*B21D 53/88* (2006.01)
*B23Q 3/18* (2006.01)
*B23Q 7/00* (2006.01)
*B23P 11/00* (2006.01)
*B60J 7/00* (2006.01)

(52) U.S. Cl. .................. 29/897.2; 29/407.09; 29/407.1; 29/464; 29/466; 29/467; 29/468; 29/469; 29/525.01; 29/559; 296/107.09; 296/216.01; 269/900; 269/37

(58) Field of Classification Search .............. 29/897.2, 29/407.09, 407.1, 429, 430, 464, 465, 466, 29/467, 468, 469, 525.01, 559, 799, 824, 29/281.1, 281.5; 296/210, 216, 1, 107.07, 296/107.09, 107.17; 269/900, 37, 45

See application file for complete search history.

(56) References Cited

U.S. PATENT DOCUMENTS

| | | | |
|---|---|---|---|
| 4,759,489 A | 7/1988 | Pigott | |
| 6,408,516 B1 * | 6/2002 | Taylor | 29/897.2 |
| 6,422,536 B1 * | 7/2002 | Kelley et al. | 254/89 R |
| 6,434,813 B1 * | 8/2002 | Grabmeier | 29/559 |
| 6,493,920 B1 | 12/2002 | Hill et al. | |
| 6,865,795 B2 * | 3/2005 | Hernandez et al. | 29/469 |
| 7,469,473 B2 * | 12/2008 | Savoy | 29/897.2 |
| 2001/0005089 A1 | 6/2001 | Neubrand | |
| 2007/0006462 A1 * | 1/2007 | Van Zile | 29/897.2 |

FOREIGN PATENT DOCUMENTS

| | | |
|---|---|---|
| DE | 3540814 | 5/1987 |
| DE | 4408038 | 9/1995 |
| DE | 29510120 | 9/1995 |
| DE | 10348122 | 5/2005 |
| WO | WO-9916659 | 4/1999 |

* cited by examiner

*Primary Examiner* — Jermie E Cozart
(74) *Attorney, Agent, or Firm* — Gifford, Krass, Sprinkle, Anderson & Citkowski, P.C.; Douglas L. Wathen (57) ABSTRACT

A lower tool frame is used in manufacturing a plurality of convertible roofs. Structural roof parts are disposed in the lower tool frame upside down with respect to their use position. Forward connection parts are provided for selectively connecting the forward end of the convertible roof to a windshield frame and rearward connection parts are provided for attaching the rearward end of the convertible roof to a vehicle body. A single upper tool frame is lowerable onto the lower tool and is used to position the forward and rearward connection parts with respect to the structural roof parts. The single upper tool frame is used to assemble all of the convertible roofs for a series of vehicles.

10 Claims, 12 Drawing Sheets

METHOD OF MANUFACTURING A PLURALITY OF CONVERTIBLE ROOFS FOR VEHICLE BODIES

REFERENCE TO RELATED APPLICATIONS

This application is a U.S. National Phase which claims priority from DE 102007006874.4, filed Feb. 2, 2007, and DE 102007006073.6, filed Feb. 2, 2007, the entire content of each application is incorporated herein by reference.

FIELD OF THE INVENTION

The present invention relates to a mass manufacturing method for roofs of convertible vehicles as well as to a tool line.

BACKGROUND OF THE INVENTION

It is necessary in the mass production of convertible roofs to maintain high dimensional precision to allow assembly of the roof to the vehicle body in as time saving a manner as possible and with as little adjustment effort as possible and to be able to ensure high dimensional accuracy and qualitative equivalence.

It is known to assemble a series of convertible roofs on parallel production stands which simulate in their position and alignment the relationships of vehicle bodies onto which the finished roofs are to be placed. A plurality of production steps must be carried out manually using templates and in an unfavorable work position with the respective assembly person looking up and working from below.

In addition problems may arise due to dimensional differences or complaints that must be traced to the production stand and the person(s) associated with a particular roof. This tracing is, however, very important for the quality assurance and, optionally, the remedying of errors.

The spacing between the front crossmember of a production stand, which simulates the windshield frame, and the rear lateral support consoles, which simulate body side mounts for lateral main support units of the roof, is set in an optimized manner. This must take into account not only the tolerances for the assembly of the parts of the roof, but also the tolerances in the design of the production stand, which makes it more difficult to provide uniformity of roofs.

Within a series of vehicles, the relative spacing between the rear consoles, where the convertible top connects, and the front windshield frame is typically constant. To compensate for possible production tolerances of the roof, the position of at least one axis of rotation within the mechanism moving the roof may be adjusted. Typically, the axis of rotation between the roof linkage and a lateral roof frame is adjusted. This variability can be achieved, for example, using lateral elongate holes. However, this results in kinematics of the roof movement which are slightly modified in dependence on the tolerance so that said roof movement takes place with non-optimized torques and with jerks under certain circumstances.

SUMMARY OF THE INVENTION

The present invention provides an improvement for the mass production of convertible roofs.

Mass production of convertible roofs is performed with the structural roof parts in an ergonomically favorable upside down position. The later problematic association of the finished roof with the production station is avoided due to the use of a single upper tool frame with all roofs. The single upper tool is used for the alignment of all connection parts of the roofs in a series. Preferably all the roofs in a series run through the work station of the same upper tool frame. So-called "multitooling" is thus completely avoided. In the event of a difference in the series, the association is unambiguous. The first time a difference occurs, it can be easily reconstructed with reference to the series numbers. The correction of an individual work station is then sufficient to restore future dimensional accuracy.

The alignment of parts can be achieved solely by lowering the upper tool frame without manual intervention, whereby the error sources are minimized and the ergonomics of the manufacturing process is further improved.

Fastening flanges are positioned for later connection of the main support units to the body. This sets the position of the main support units relative to the windshield frame without having to change the position of any axis of rotation within the roof mechanism. The roof mechanism can always be made in the same way despite the need for a tolerance compensation so that the roof movement is always the same and optimized.

The same upper tool frame can be used for longitudinally positioning closures at the front of the roof. The upper tool frame can remain in its centered position—in particular in a plurality of spatial directions—with respect to the lower tool frame for both alignment procedures, which additionally improves the production accuracy.

The alignment can be performed in an automated procedure. The upper tool frame may include downwardly extending alignment pins, optionally tapered, which may engage the fastening flanges.

The transfer of the manufactured roof onto the body of the vehicle is simplified if, in this transfer, the fastening flanges of the main support units can be set onto pins arranged on the body. The pins may face upwardly in an aligned position corresponding to the position of the alignment pins of the upper tool frame during roof production.

In addition, the same upper tool frame, or a second tool frame arranged in series after it, can also carry out the assembly or at least alignment of sealing rails to be mounted laterally to the roof with respect to the side windows. This further facilitates the manufacturing process and improves the fitting accuracy.

The manufacturing method in accordance with the invention can also be optimized for different roof lengths within a series. For example, the frame parts of the roof may be covered with rigid panels in a first embodiment and have a textile covering in a second embodiment and a vinyl covering in a third embodiment. The lowerable upper tool frame, which is used to align the respective fastening flange position, may having an adjustable portion. The position of the adjustable potion can be set in an optimized position with respect to the tool frame depending on the roof design. The roof using rigid panels does not have tensile strain on the joints of the roof mechanism. The roof with the textile covering has some strain in the longitudinal direction and for the roof with the vinyl covering has more strain in the longitudinal direction onto the roof mechanism. Even those fine differences within the hinge clearance add up, for example, to a total of up to three millimeters and can thereby be taken into account.

A tool line likewise claimed in accordance with the invention for the prior mass production of convertible roofs is additionally minimized in its width dimensions by the only one production line.

BRIEF DESCRIPTION OF THE DRAWINGS

Advantages of the present invention will be readily appreciated as the same becomes better understood by reference to the following detailed description when considered in connection with the accompanying drawings.

DETAILED DESCRIPTION OF THE INVENTION

Figure 1:
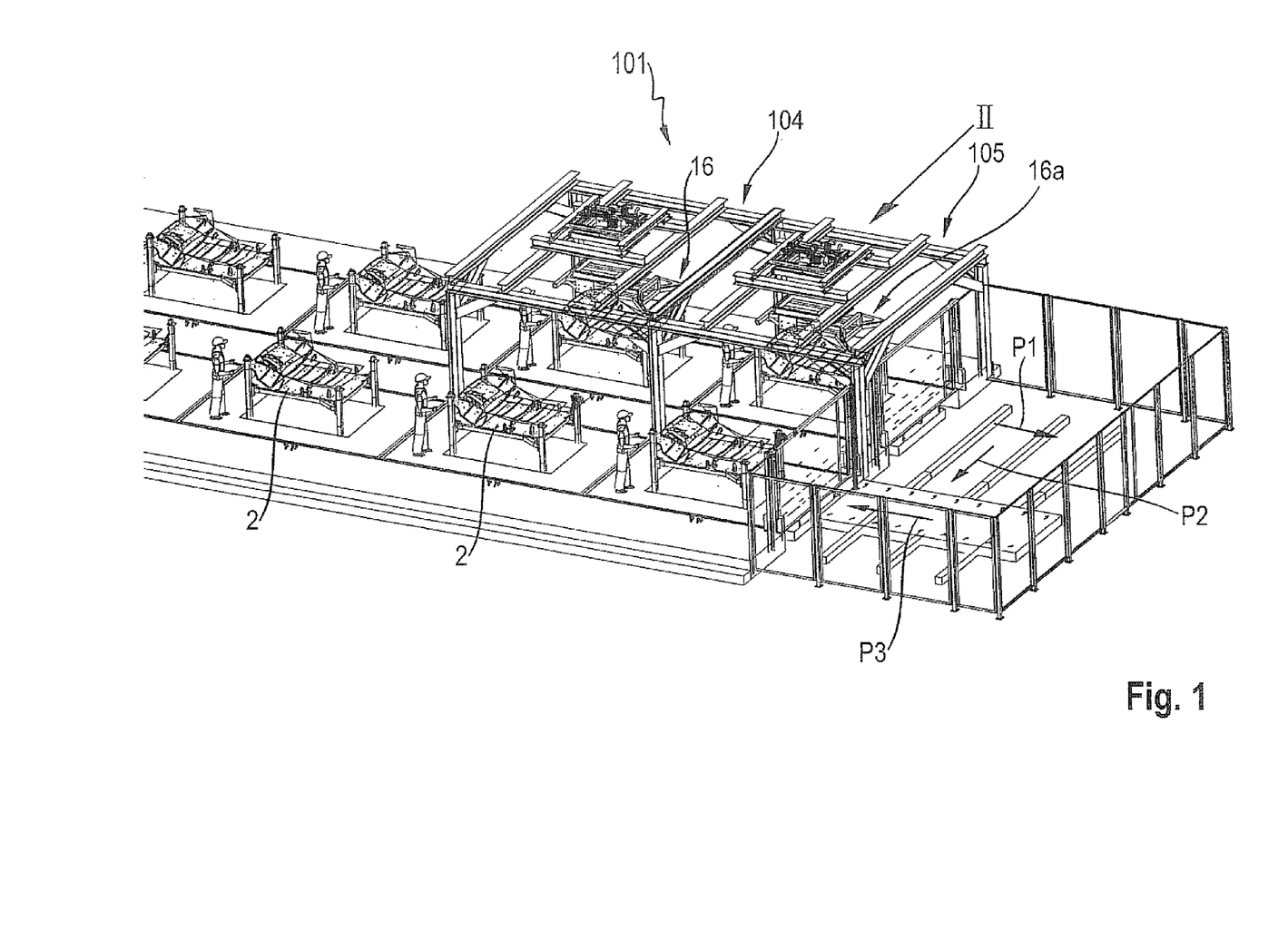
FIG. 1 is a schematic, perspective view of a section of a tool according to an embodiment of the present invention which shows the work stations provided with lowerable upper tool frames.
Figure 2:
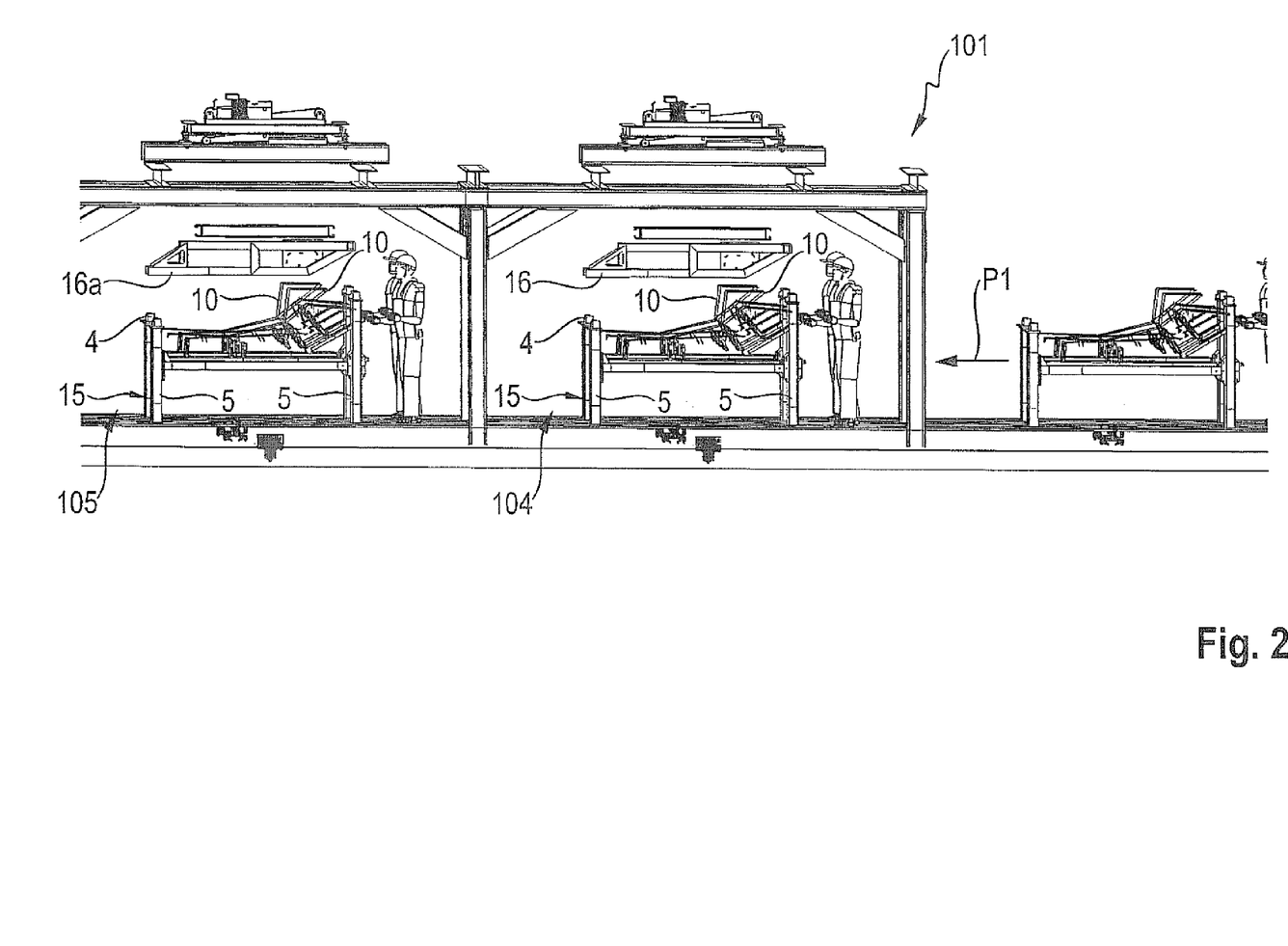
FIG. 2 is a side view approximately from the direction of the arrow II in FIG. 1 of two work stations disposed sequentially in series and provided with lowerable upper tool frames.

Referring to FIG. 1, a tool line 101 for the mass production of roofs 2 of convertible vehicles 1 (FIG. 12) includes a single production line to produce all the roofs in sequence, with the movement of the roofs indicated by the arrows P1, P2, P3.

Figure 12:
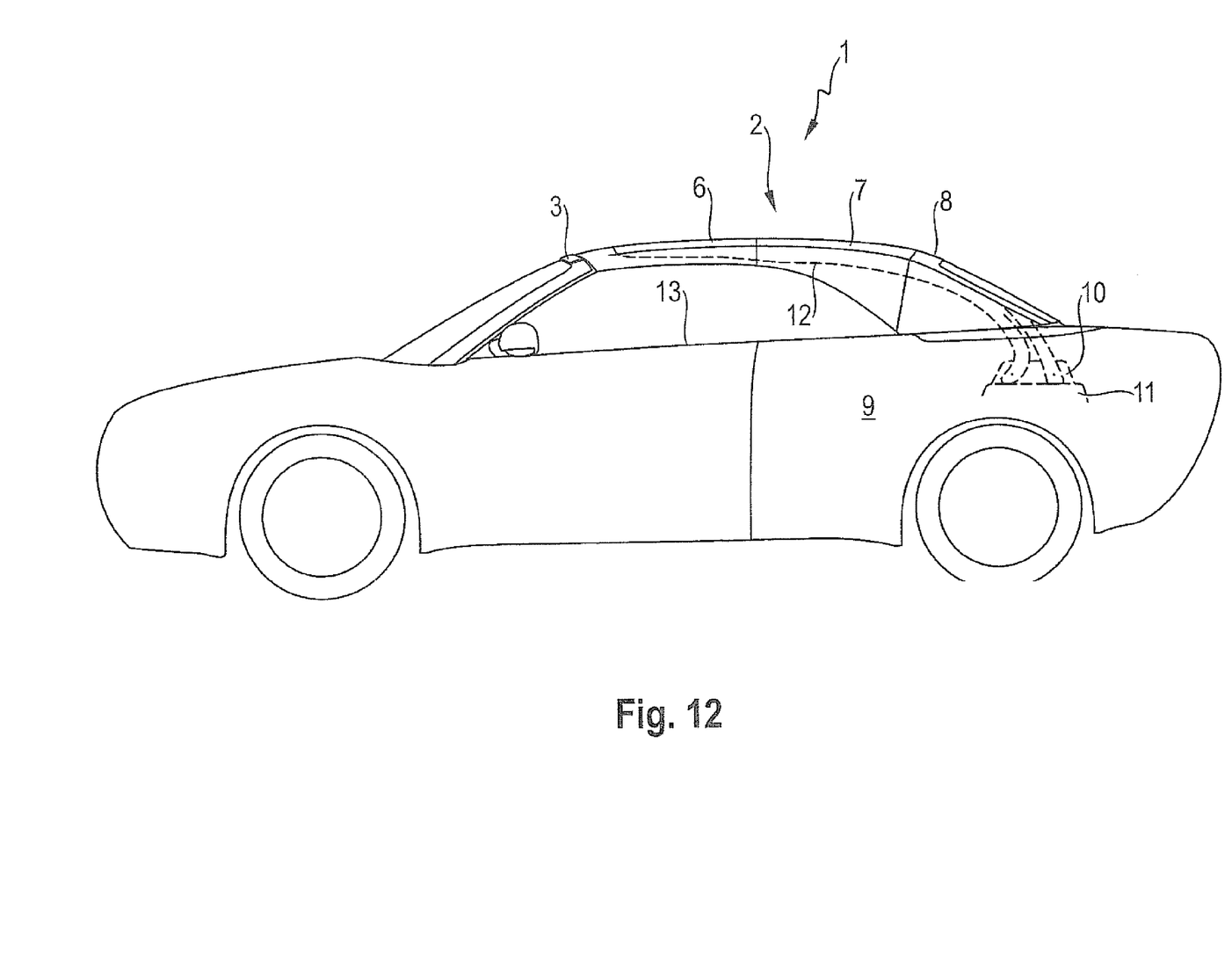
FIG. 12 is a side view of a convertible vehicle provided with a roof assembled in accordance with the invention.

The roofs 2 produced on the tool line 101 adjoin a windshield frame 3 in their finished position and are movably connected to the body 9 of the vehicle 1 (FIG. 12). As shown, the roofs may be retractable hard tops (RHT), that include a plurality of assemblies 6, 7, 8. These assemblies have outer surfaces that are separate from one another and are generally rigid. Alternatively, the assemblies may form soft tops, and be covered by a common flexible covering. The present invention allows either a soft top with a common covering or a RHT with a plurality of individual rigid elements 6, 7, 8 to be assembled with the same type roof linkage parts 12 and this can be varied during ongoing production. As will be explained in more detail below, different coverings may be provided for soft tops in a varying manner and with a respective fine adjustment of the roof length.

The vehicles 1 assembled in this manner also include lateral main pivot brackets to movably attach the respective roof 2 in the rear vehicle area, the main pivot brackets being attached to console shaped receivers 11, as shown in a general view in FIG. 12.

Figure 5:
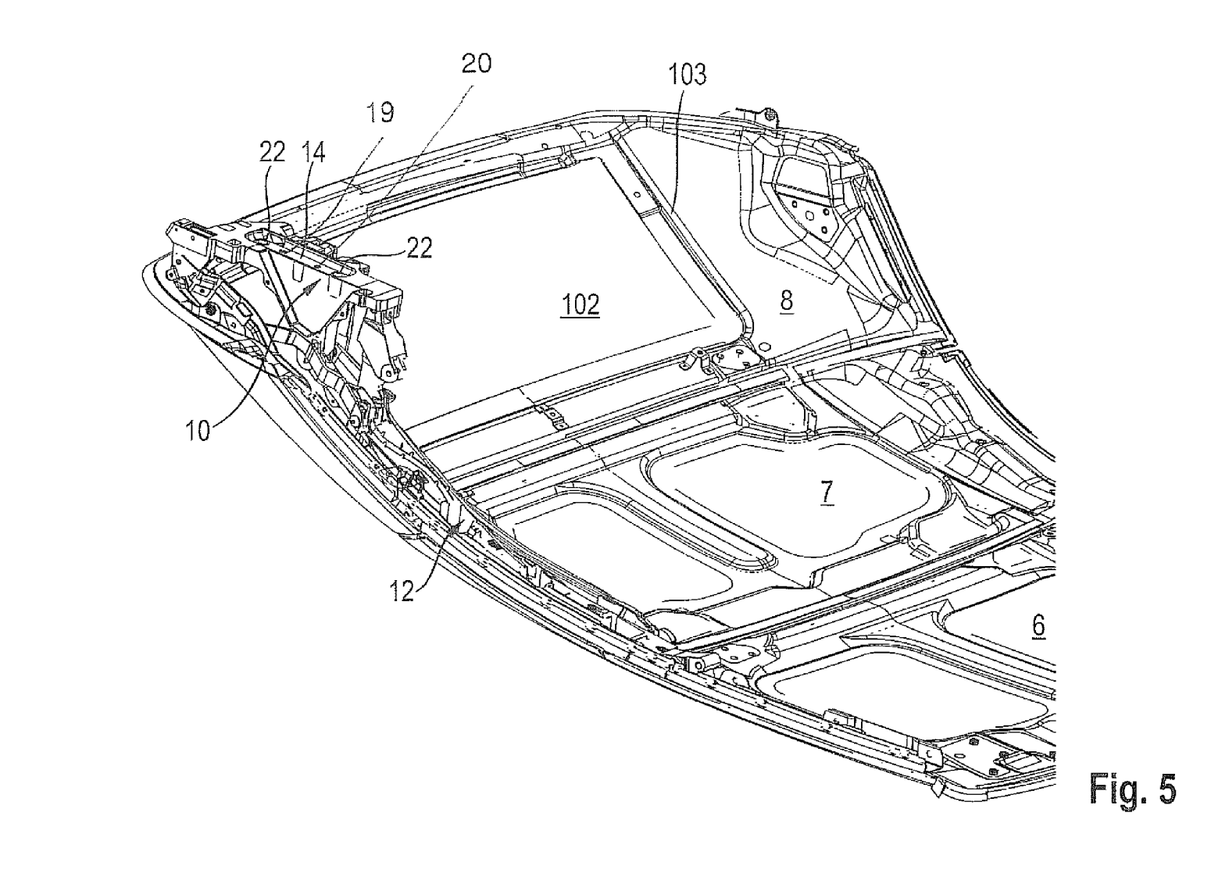
FIG. 5 is a perspective view of the roof produced in the position of FIG. 4.

Linkage parts 12 extend generally in a vertical longitudinal vehicle plane, as indicated by dashed lines in FIG. 12, from these mounts 11 in the direction of the roof 2. The linkage parts 12 are disposed below the outer surface of the roof 2 and are disposed above a window belt line 13. Each main support unit 10 is provided with at least one fastening flange 14 (FIG. 5) for attachment to the body 9. The fastening flanges 14 can be aligned with the main support units 10 during roof assembly to obtain consistent dimensions for the later roof assembly.

Figure 3:
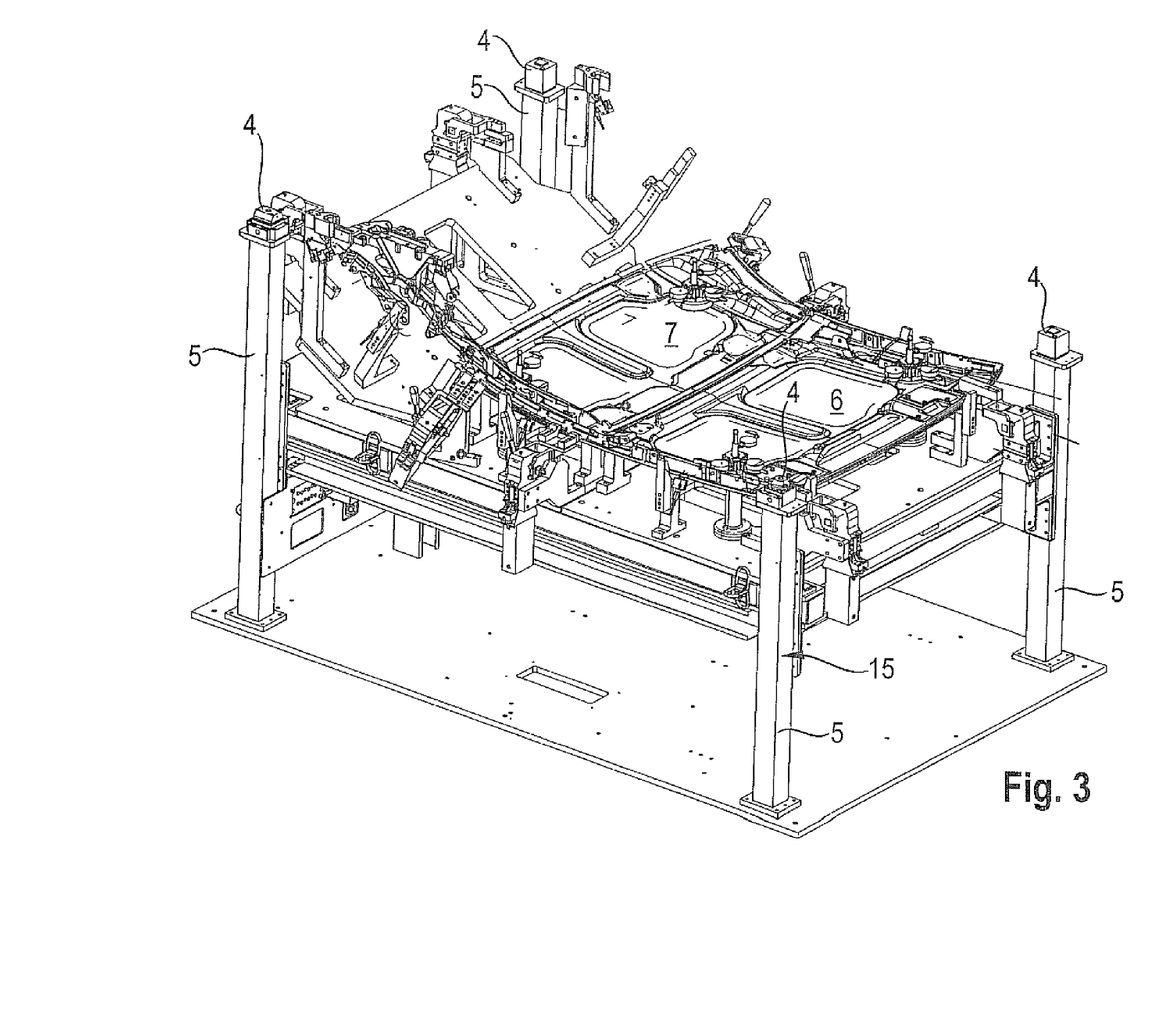
FIG. 3 is a perspective view of a lower tool frame with two structural roof parts positioned upside down position and end to end in the front region of the lower tool frame.

According to the present invention, a roof can be produced with rigid elements 6, 7, 8 or other structural roof parts (for example transverse top bows, the rear window 102 and a frame part 103 surrounding and supporting the window, and which together form a component of the rearmost roof part 8), and may include a covering. The roof parts are inserted in an upside down position into a lower tool frame 15, and are adjusted and fixed in this position via closures (See FIGS. 3 and 4). Subsequently, linkage parts 12 are turned upside down and are supplied from above and at least temporarily fastened. The linkage parts 12 are initially positioned at their front ends which extend from the main support units 10 and attach to the roof parts 6, 7, 8. The linkage parts can initially be loosely positioned to be ready for further assembly. The main support units 10 are positioned upside down and face upwardly (see FIG. 4). The base end of the fastening flange 14 is displaceable with respect to the main support unit. These elements are visible and can be adjusted from above.

Figure 6:
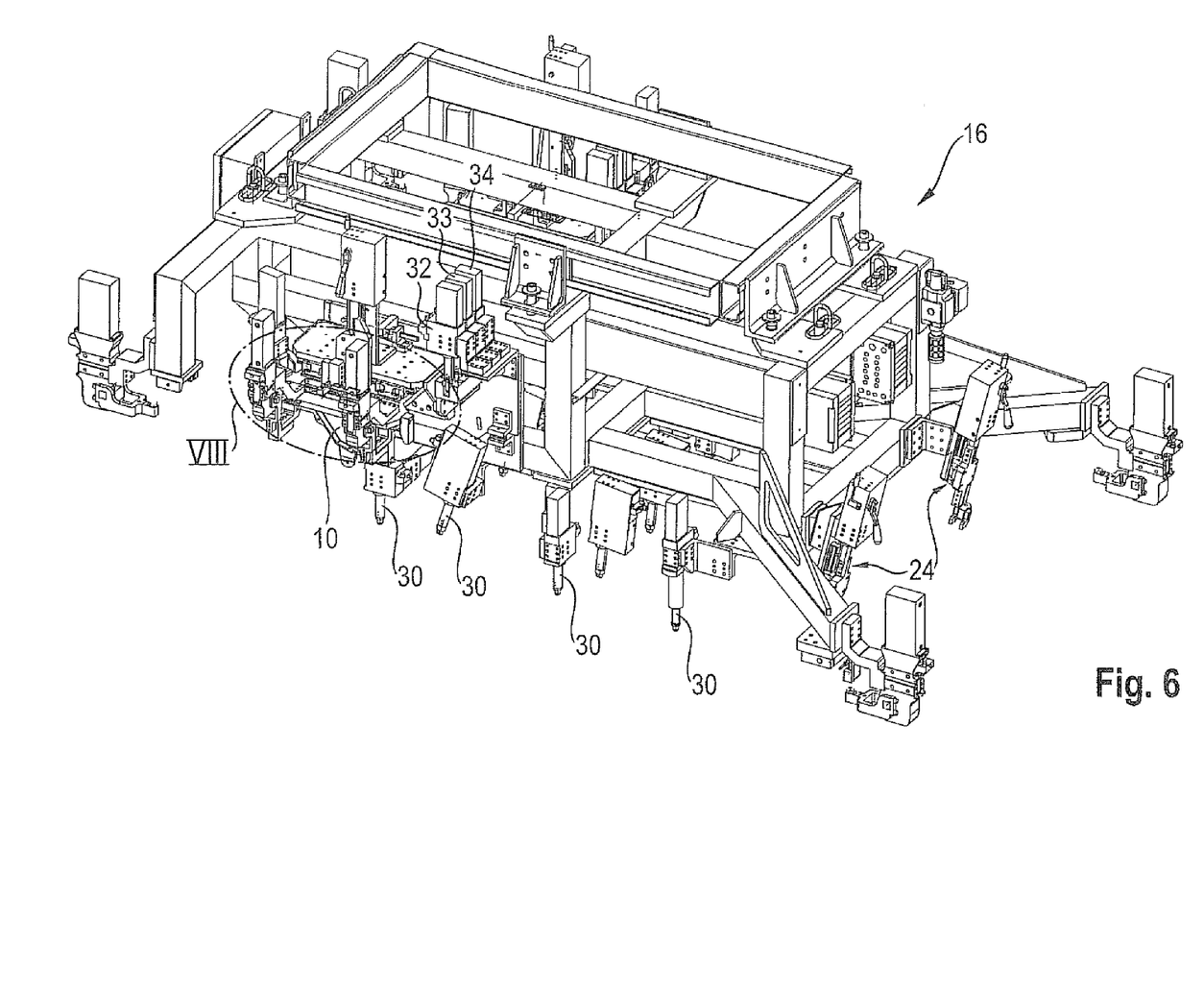
FIG. 6 is a perspective view of an upper tool frame which can be lowered onto the production tool of FIG. 4 from above and in so doing fixes the main support unit.
Figure 7:
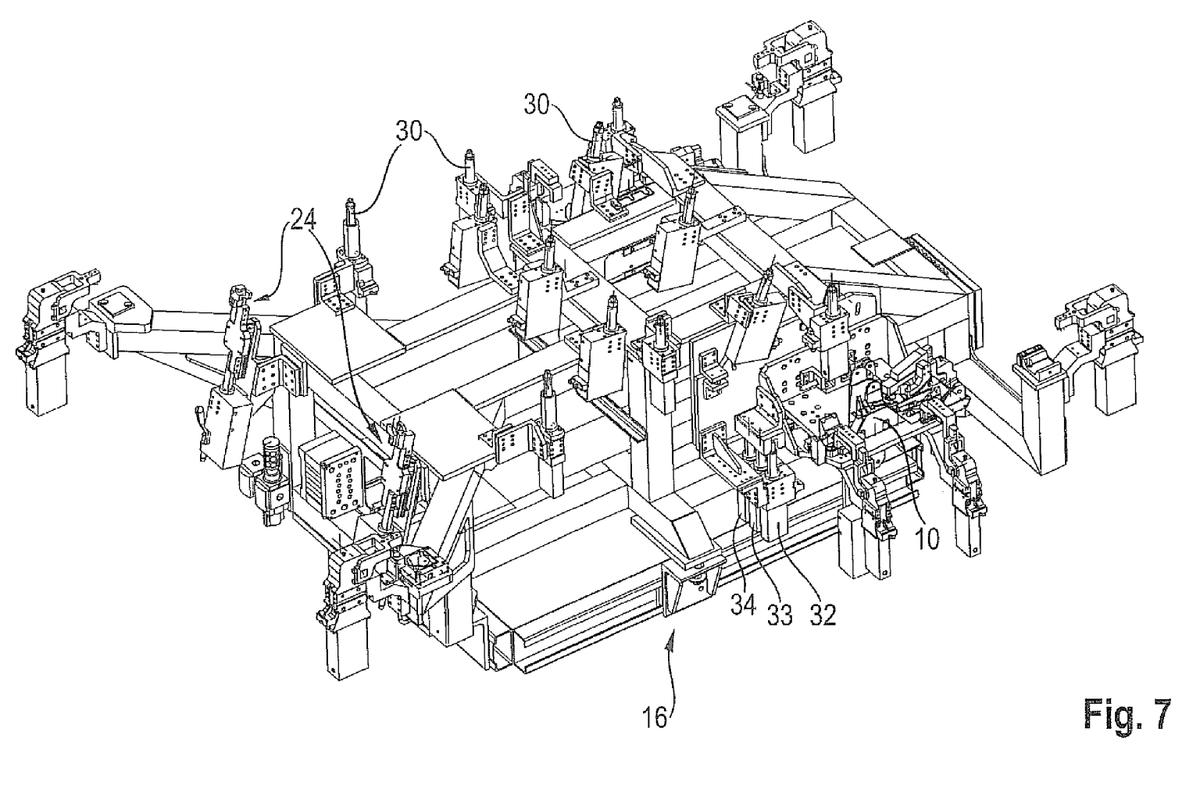
FIG. 7 is a view of the upper tool frame of FIG. 6 turned upside down.

An upper tool frame, or fixture, 16 is shown in detail in FIGS. 6 and 7. The upper tool frame forms part of the tool line 101 at the work station 104 (see FIG. 1). The upper tool frame 16 is lowered onto the lower tool frame 15, which holds the roof parts 6, 7, 8 and the linkage parts 12 with the main support unit 10 facing upwardly. The upper tool frame 16 is centered in multiple directions by the columns 5. The columns 5 include various alignment devices to position the upper tool frame. These may include a conical and a prism alignment device. The upper tool frame 16 may also include pneumatical cylinders 30 as an additional adjustable aid for the roof parts 6, 7, 8.

Preferably, all of the roofs in a series, without exception, are produced on the tool line 101. All of the structural roof parts 6, 7, 8 of these roofs are preferably assembled in a serial production routine in the described upside down position using the same upper tool frame 16 in the work station 104. This approach provides alignment of all connection parts 14, 24 for attaching each roof 2 to the vehicle bodies 9. The process is preferably fully automated and will be described in more detail below. Further assembly and alignment steps are also possible in this work station 104. The main support units may be aligned with linkage parts and the fastening flanges 14 may be moved into their final position and fixed to the main support units 10.

The latch elements 25 at the front may be adjusted using downwardly projecting fixing means 24 on the upper tool frame 16. The distance between the latch elements 25 and the fastening flanges 14 is necessarily always the same with all roofs in the series due to the use of the same upper tool frame 16.

The fastening flanges 14 are generally longitudinal strips and are aligned such that alignment pins 17, 18 on the upper tool frame 16 engage alignment holes 19, 20 in the fastening flanges 14. The alignment pins extend downwardly and have precise dimensions.

Figure 4:
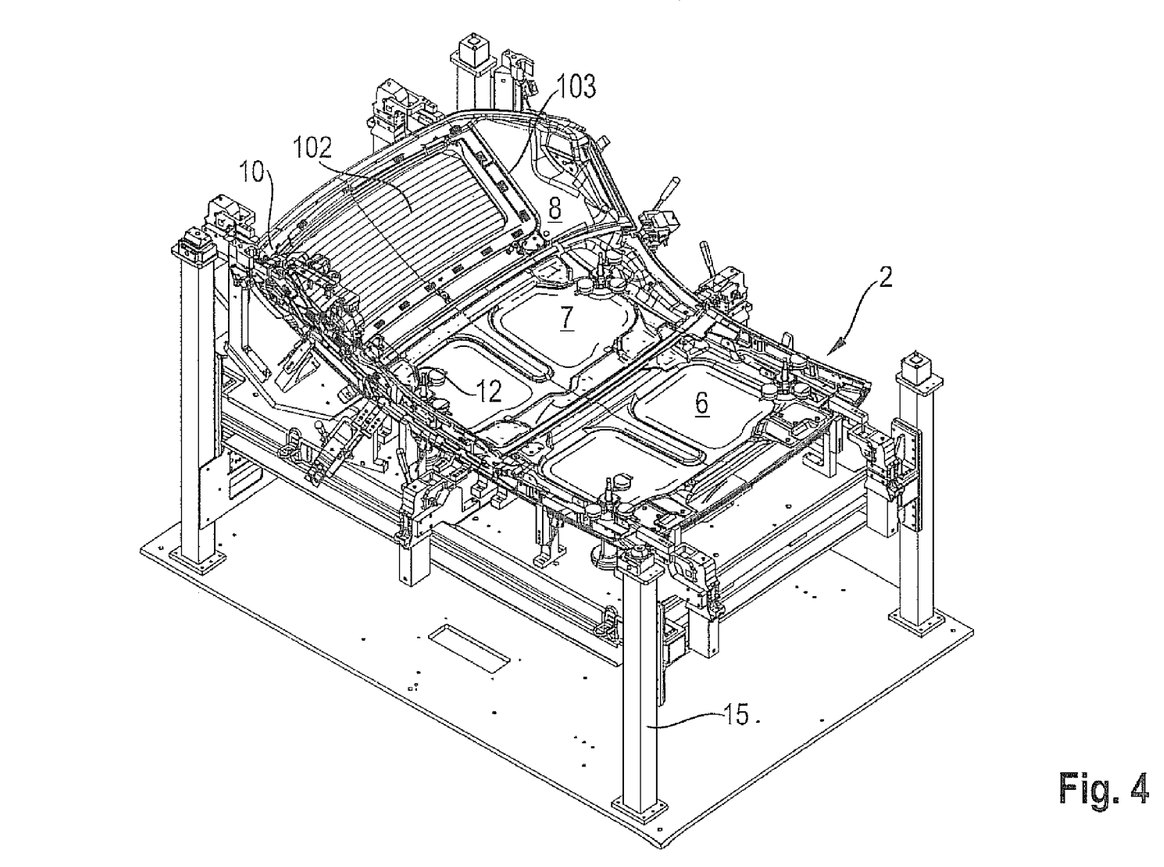
FIG. 4 is a view similar to FIG. 3, showing a rear structural roof part including a window and a frame part, a main support unit, and linkage parts extending from the main support unit disposed upside down during the production of the roof.

In FIGS. 6 and 7, the upper tool frame 16 is shown with the main support part 10, but without the linkage parts 12 just to provide a better overview. In reality, the assembly including the linkage parts 12 and main support units 10, as shown in FIG. 4, is connected to the roof parts 6, 7, 8 and then the upper tool frame is lowered onto these parts.

The roof parts can be aligned in a plurality of directions, with alignment in a direction parallel to the longitudinal direction of the vehicle—and thus parallel to the largest extent of the roof 2—being of particular importance.

In order to align and engage the pins 17,18 with the alignment holes 19, 20, the fastening flange remains displaceable and at least one of the holes 20 is not oversized with respect to the pin diameter. Therefore, the fastening flange can be moved to the correct position, in particular in the direction of the arrow 23 (see FIG. 8), when the pin engages. The fastening flange is displaceable in a transverse plane with respect to the main support unit 10, which is held in a fixed position by the linkage 12. The second hole 19 is an elongate hole to avoid an interference.

After the fastening flange 14 is aligned, it can be fixed to the main support units using fasteners 22, such as screws, that extend through elongate holes 22 in the fastening flange (see FIG. 5) and engage precisely fitting bores 4 (see FIG. 8) in the main support units 10.

The forward end of the upper tool frame 16 of the work station 104 further includes adjustment and fixing units 24 which extend downwardly and cooperate with the front roof part 6 when the upper tool frame 16 is lowered. These adjustment and fixing units 24 help to precisely position 25, for example hooks or hoops, for assembly to the roof part 6. The spacing between the rear pins 17, 18 and the front adjustment and fixing units 24 is always the same, which leads to a consistent spacing between the connection to the mounts 11 on the vehicle body and the position of the closures 25 at the windshield frame for the finished roofs.

These additional front adjustment and fixing units 24 may also include downwardly projecting conical pins, as well as a device for attaching screws, performing welding, or attaching rivets.

Lateral sealing rails can also be mounted to the transverse edge of the roof 2 by the same upper tool frame 16, or by an additional tool frame 16a—drawn here in the subsequent work station 105—when it is in its lowered position. The tool frame 16 or 16a includes positioning elements that enable a three-dimensional alignment of the sealing rails at the roof edge for dimensionally precise assembly of these sealing rails. For example, three sealing rails can be provided which are each to be mounted to the lateral edges of the, in this case, three plate parts 6, 7, 8 and therefore do not restrict their movability with respect to one another.

Figure 8:
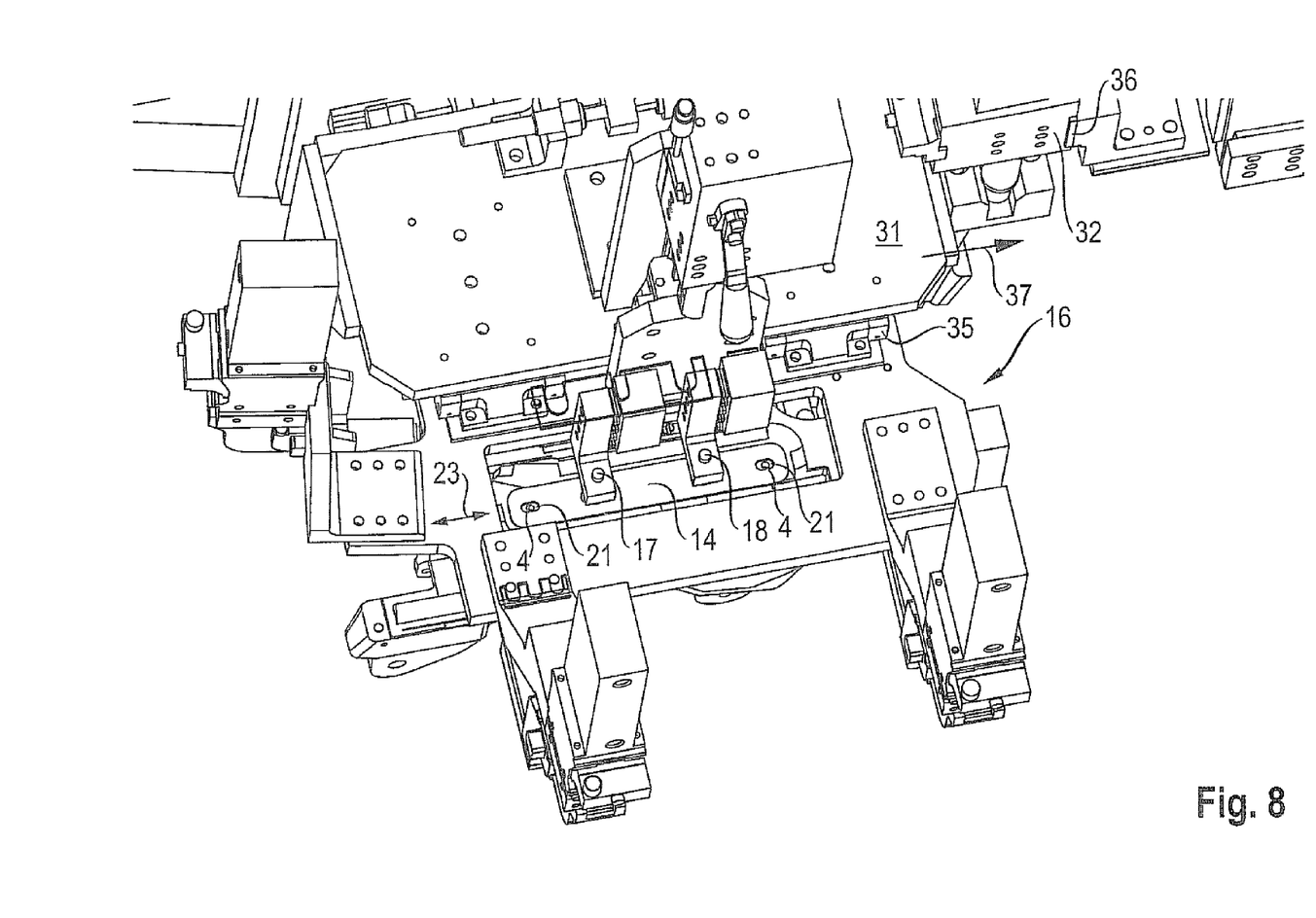
FIG. 8 is a detailed view of a section of the upper tool frame showing downwardly engaging spigots for the alignment of the fastening flange of a main support unit in an engaged position, the view approximately corresponding to the section VIII in FIG. 6.
Figure 9:
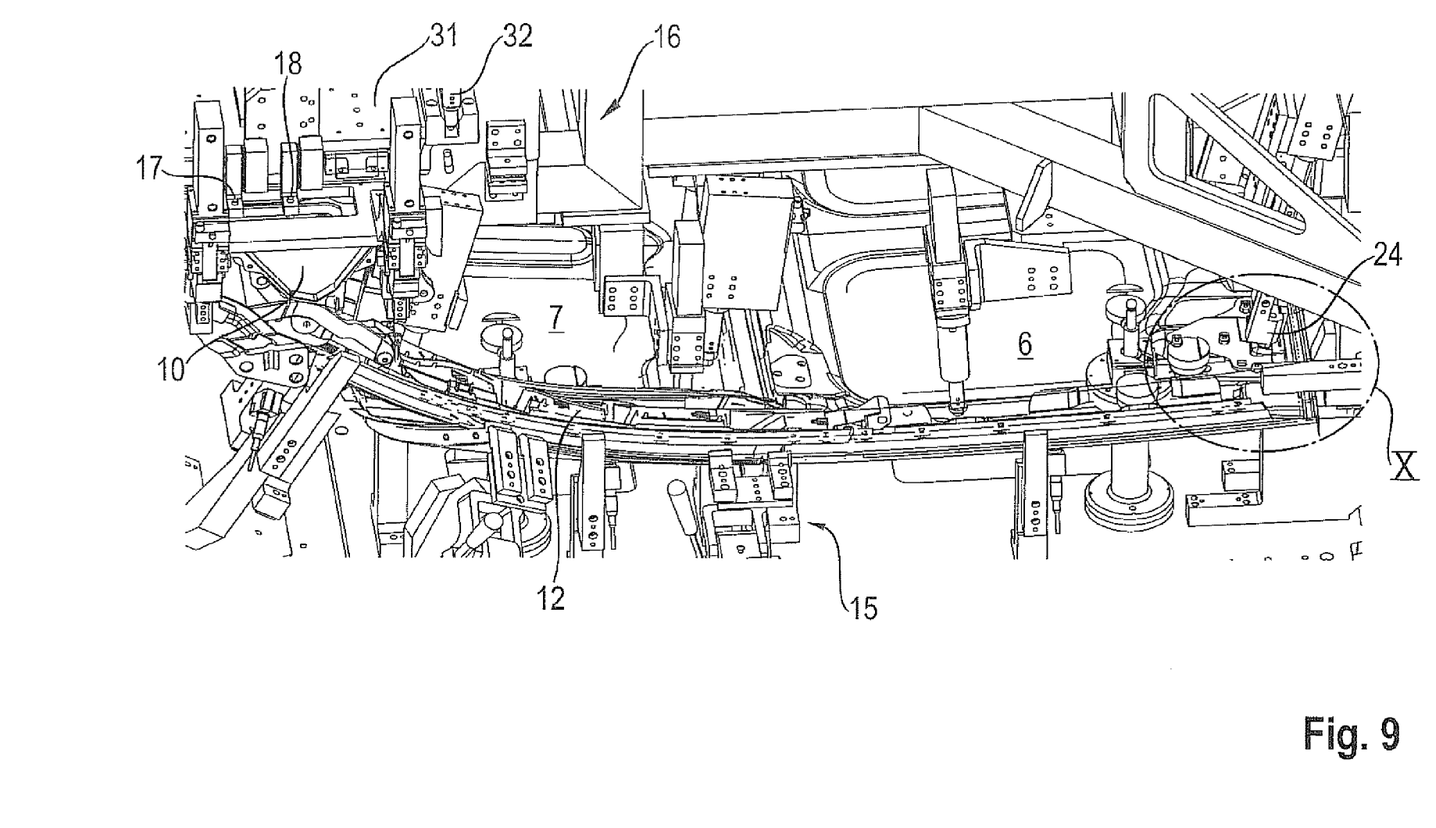
FIG. 9 is a view looking down on the roof parts held in the lower tool frame, the linkage parts mounted thereon, the fastening flange aligned by alignment pins on the upper tool frame and additional fixing units for positioning the front roof closures at the roof tip.
Figure 10:
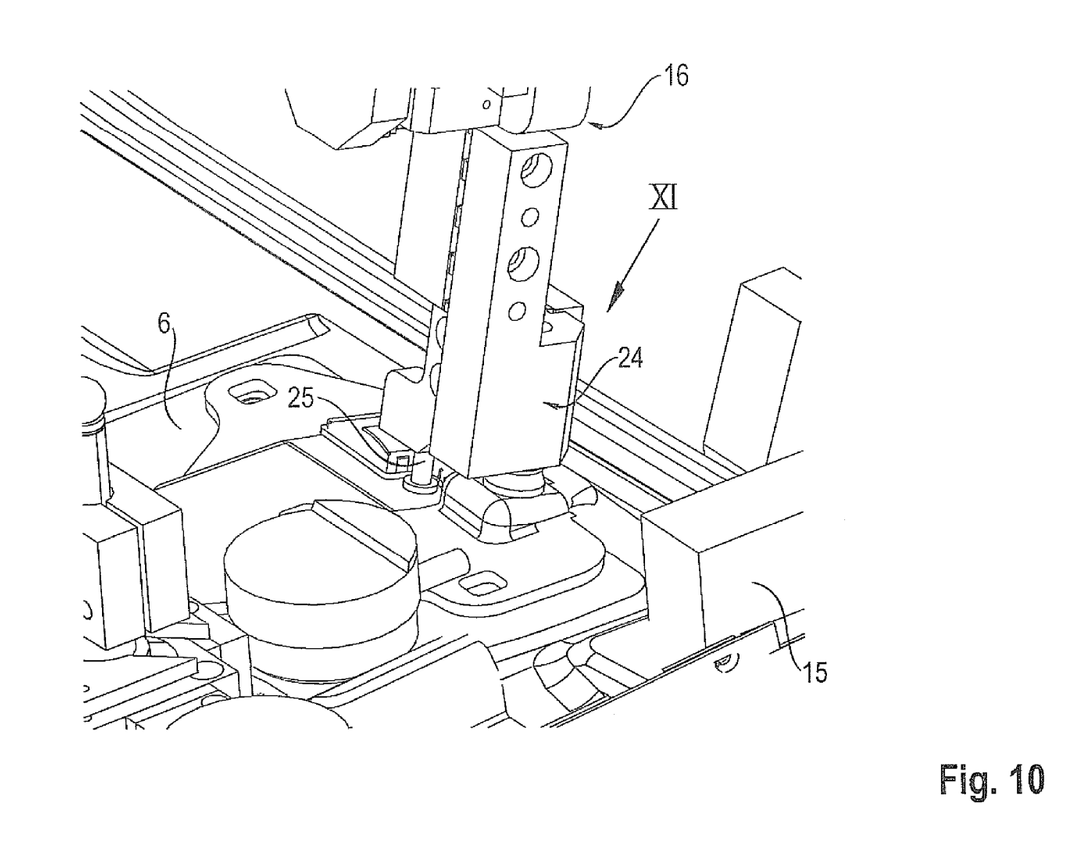
FIG. 10 is a view approximately corresponding to the detail X in FIG. 9.
Figure 11:
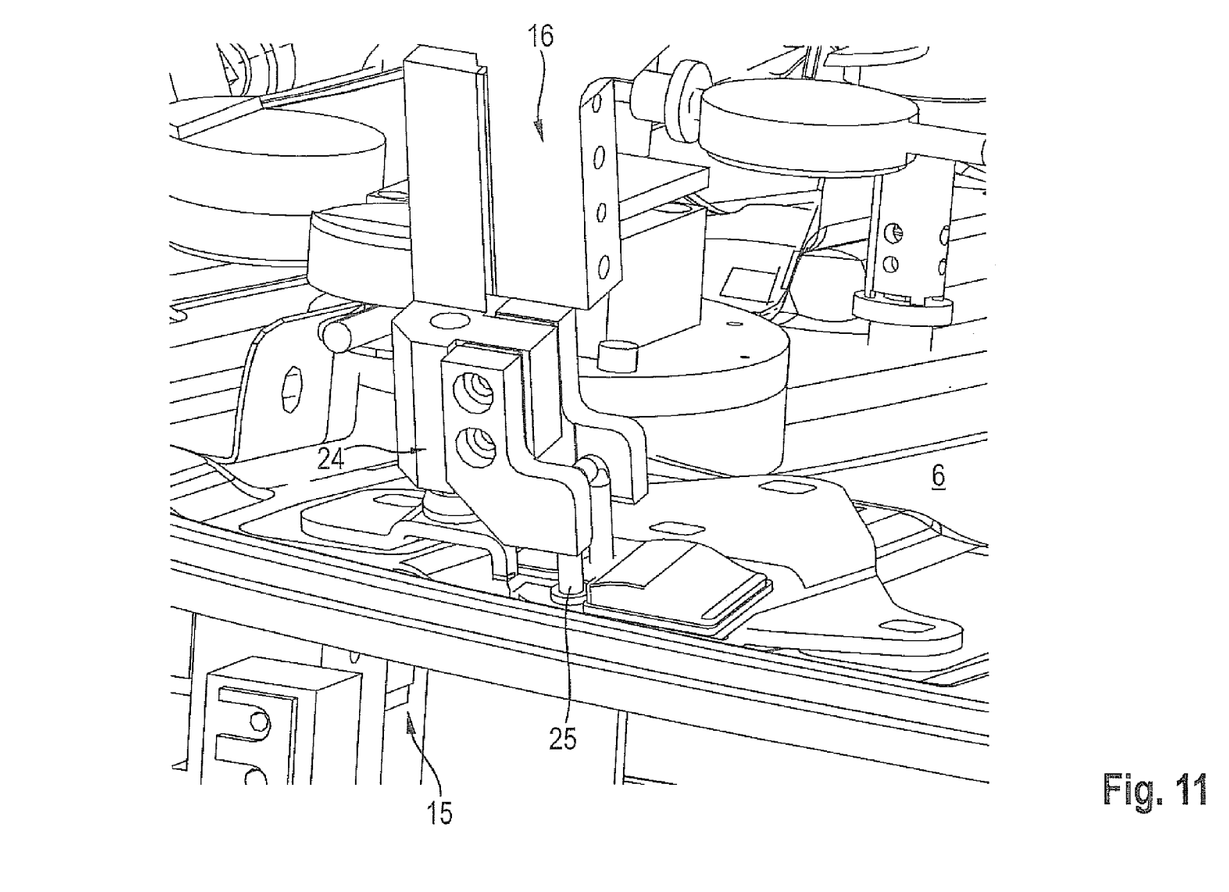
FIG. 11 is a view approximately corresponding to the arrow XI in FIG. 10.

FIGS. 6 and 8 illustrate an alternative approach to the alignment of the fastening flange 14. In this embodiment of the present invention, the alignment pins 17, 18 for aligning the fastening flange 14 are supported on a plate 31 that is movable with respect to the tool frame 16. Different longitudinal spacings can thus be set between these pins 17, 18 and the front fixing and adjustment units 24 for the closures 25 at the front of the roof. This enables the manufacture of different roof lengths in one and the same tool 15/16.

Three relative positions of the pins 17, 18 with respect to the front adjustment units 24 can be set via, in this case, three adjustment members 32, 33, 34. The plate supporting the pins 17, 18 is longitudinally movable on a rail 35 for this purpose. A first relative position is provided for a roof 2 with solid roof parts 6, 7, 8 as is shown here. A second relative position can be provided for a roof 2 with a textile covering and a third relative position can be provided for a roof 2 with a vinyl covering, with the vinyl covering exerting a stronger tensile force on the roof linkage 12 than the textile covering—and this in turn being greater than the fixed roof parts. With the roof 2 with a vinyl covering, an adjustment unit 32, 33, 34 slightly shortening the roof 2 will therefore come into engagement and pull the plate 31 slightly forward in the direction of the arrow 37. The exact position of the engaging adjustment members 32, 33, 34 with respect to the longitudinal direction of the roof can be fixed, for example, via shim packs 36.

The roof 2, including the front closures 25 and properly positioned fastening flanges 14, is turned over and assembled to a vehicle body 9. The vehicle body includes holding pins similar to the pins 17, 18 of the upper tool frame 16 and which extend upwardly. These holding pins, which are arranged on the console shaped receivers 11, can also be movable using a plate that is similarly displaceable to the fastening flange 14 with respect to the body 9. This allows the roof 2, which is always the same (for a given covering type) to adapt to possible tolerances of the body 9 between the windshield frame 3 and the rear mounts 11.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

I claim:

1. A method of manufacturing a plurality of convertible roofs for assembly to a plurality of vehicle bodies to provide a series of vehicles, the vehicle bodies each having a passenger compartment and a windshield frame at the front of the passenger compartment, each convertible roof when assembled having a forward end and a rearward end, the convertible roofs each having an extended position wherein the forward end connects to the respective windshield frame, the method comprising:
   providing a lower tool frame;
   providing a plurality of structural roof parts each having an outer surface such that the outer surfaces cooperate to form an outer surface of a convertible roof when assembled, the structural roof parts having a use position when assembled and the convertible roof is in the extended position;
   disposing the structural roof parts in the lower tool frame upside down with respect to their use position;
   providing forward connection parts for selectively connecting the forward end of the convertible roof to the windshield frame and rearward connection parts for attaching the rearward end of the convertible roof to the vehicle body;
   providing a single upper tool frame that is lowerable onto the lower tool frame; and
   using the single upper tool frame to position the forward and rearward connection parts with respect to the structural roof parts;
   wherein the single upper tool frame is used to assemble all of the convertible roofs for the series of vehicles.

2. The method of claim 1, further comprising:
   providing main support units;
   providing linkage parts extending from the main support units;
   after disposing the structural roof parts upside down in the lower tool frame, positioning the main support units and the linkage parts onto the structural roof parts from above;

the connection parts including fastening flanges, the fastening flanges being movable with respect to the main support units and then fixable thereto;

the step of using the single upper tool frame to position the connection parts with respect to the structural roof parts comprising using the single upper tool frame to position the fastening flanges with respect to the main support units; and fixing the fastening flanges to the main support units after the flanges are positioned.

3. The method according to claim 2, wherein:

the upper tool frame further includes downwardly extending alignment pins and the fastening flanges include alignment openings, the alignment pins engaging the alignment openings to position the fastening flanges with respect to the main support units.

4. The method according to claim 3, wherein:

the fastening flanges further include at least one elongated hole defined therethru; and the step of fixing the fastening flanges to the main support units comprises disposing a fastener thru the at least one elongated hole.

5. The method according to claim 3, wherein the vehicle bodies each have alignment pins corresponding in position to the alignment pins on the upper tool frame, the method further comprising:

turning the assembled convertible roof over and disposing the main support units such that the alignment pins on the vehicle body extend through the alignment openings in the fastening flanges.

6. The method according to claim 1, wherein:

the connection parts including closures to be connected to the forwardmost structural roof part;

the upper tool frame including downwardly extending fixing units;

the step of using the single upper tool frame to position the connection parts with respect to the structural roof parts comprising using the single upper tool frame to position the closures using the downwardly extending fixing units.

7. The method according to claim 1, further comprising:

providing sealing rails for mounting to the sides of the convertible roof; and using the single upper tool frame to position the sealing rails with respect to the convertible roof.

8. The method according to claim 1, wherein:

the single upper tool frame has an adjustable portion with a plurality of positions, the adjustable portion positioning the rearward connection parts with respect to the structural roof parts.

9. The method according to claim 8, wherein:

the adjustable portion having a first position for positioning the rearward connection parts of a retractable hard top convertible roof and a second position for positioning the rearward connection parts of a retractable soft top convertible top with a textile outer covering and a third position for positioning the rearward connection parts of a retractable soft top convertible top with a vinyl outer covering.

10. The method according to claim 1, further comprising:

a multidimensional alignment device for adjusting the position of the upper tool frame relative to the lower tool frame.

\* \* \* \* \*